a considerable length of time, i.e. at least 10 hours and up to about 30 hours.

3,100,800
IMPROVED CALCIUM SALTS OF BRIDGED PHENOL SULFIDES AND METHOD OF PREPARING SAME

Elmer B. Cyphers, Cranford, N.J., assignor to Esso Research and Engineering Company, a corporation of Delaware
No Drawing. Filed Feb. 12, 1962, Ser. No. 172,760
7 Claims. (Cl. 260—609)

This invention relates to improved calcium salts of bridged phenols, their preparation and uses.

Metal salts of bridged phenols have been widely described in the art. See, for instance, U.S. 2,449,026, 2,472,504 and 2,461,335. Such metal salts have been used in oils as additives serving as oxidation inhibitors, detergents, dispersants, detergent-inhibitors, and the like. In general, such metal salts have been prepared from alkaline earth metals, particularly barium. But it has not been possible to prepare satisfactory salts of bridged phenols containing solely calcium metal. For some unknown reason it is extremely difficult to convert all the phenolic groups into the calcium metal derivative. This phenomenon is disadvantageous since for many additive uses, such as detergents and detergent-inhibitors, a high ratio of metal to bridged phenol is particularly desirable. On the contrary, the reaction with barium base goes easily to completion, converting essentially about 100% of the phenol groups into the barium metal derivatives. In order to obtain suitable salts containing at least some calcium, the customary procedure has been to react the bridged phenol with calcium in the form of an oxide or other suitable base and to carry the reaction as far along as is possible, i.e. convert as many of the phenolic groups into the metal derivatives as possible. This has never been to completion, i.e. only about 70 to 75% conversion. The reaction was completed by reacting the calcium-containing reaction mixture with a barium metal base. This type of combination barium-calcium metal salts of alkyl bridged phenols has found great acceptance for use as additives particularly for those used in formulating lubricants for diesel engines, especially railroad diesel engines.

Although the all-barium or combination barium/calcium-containing additives can meet the standards required in a railroad diesel lubricant, the railroad diesel operators are highly desirous of obtaining lubricants containing additives of equivalent value comprising all-calcium derivatives of bridged phenols. The reason for this is fourfold. First, they are convinced that barium-containing additives result in increased valve deposit conditions as compared with calcium-containing additives. Secondly, they believe that these barium deposits tend to be thrown off as long-glowing, red-hot sparks, thus leading to right-of-way fires. On the contrary, calcium deposits when thrown off do not glow long enough to cause fires. Thirdly, calcium is considerably less expensive than barium on a mole basis. Fourthly, calcium-containing additives have a lower ash content than barium-containing additives on a mole basis. Thus, it would be desirable if an all-calcium salt of a bridged phenol could be made which could be formulated into a lubricant having the ability to meet the same railroad diesel specifications as lubricants containing the barium salts. It has been recently discovered that by utilizing certain reactants and conditions, calcium salts of bridged alkyl phenols can be obtained in which essentially 100% of the phenolic groups have been converted into calcium derivatives.

Briefly, the above process is carried out as follows. An all-calcium salt of a bridged phenol is prepared by reacting a reaction product of a calcium base, e.g. $Ca(OH)_2$ and hydrogen sulfide, with the bridged phenols. The reaction between the reaction products and the bridged phenol is generally carried out at temperatures of about 0° F. to 150° F., e.g. 50° to 150° F., for about 10 to 120 minutes, e.g. 20 to 80 minutes. It is believed that the major reaction product obtained in the reaction between $Ca(OH)_2$ and $H_2S$ is $Ca(SH)_2$. When the product is crystallized, the formula is $Ca(SH)_2.6H_2O$. As $Ca(SH)_2$ tends to decompose upon exposure to air but is quite soluble in water or alcohol, the preferred method of carrying out the reaction between $Ca(SH)_2$ and an alkyl phenol is to employ a polar solvent containing hydroxy substituents such as water or a $C_1$–$C_6$, e.g. $C_1$–$C_3$, aliphatic monohydroxy alcohol or a mixture of water and the aforementioned alcohols. The solvent can be removed by suitable methods, such as distillation, at the end of the reaction and the product can be further thoroughly dried by blowing at an elevated temperature with an inert gas. It is not essential that all the solvent be removed. As much as 10 wt. percent can remain, but it is preferred that the solvent concentration be reduced to 2 wt. percent or below. Such inert gases may be argon, neon, light hydrocarbon gases, CO and preferably $N_2$. In most instances, $CO_2$ should not be used since it forms carbonates which are detrimental to silver-steel lubricity in the final product. After blowing, the product may be further purified by filtration with conventional filter aids such as Hyflo (a diatomite).

The calcium hydrosulfide ($Ca(SH)_2$) can be conviently prepared by bubbling $H_2S$ into a solution of the hydroxy-containing polar solvent and $Ca(OH)_2$. The $Ca(OH)_2$ may be dispersed in any quantity up to and exceeding its solubility in the hydroxy-containing polar solvent. $Ca(OH)_2$ is sparingly soluble at ambient or elevated temperatures in alcohol and water; however, solubility can be increased by lowering the temperature of the solvent. When relatively large yields of $Ca(SH)_2$ are desired a milk of lime suspension can be used. This suspension has more $Ca(OH)_2$ present than will dissolve. After the reaction mixture is $H_2S$ saturated, it is preferably filtered, although it can be used as is, since $Ca(SH)_2$ is much more soluble than $Ca(OH)_2$.

An alternative method of obtaining $Ca(SH)_2$ is from the hydrolysis of CaS. Thus,

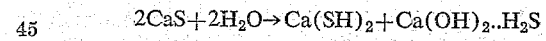
$$2CaS + 2H_2O \rightarrow Ca(SH)_2 + Ca(OH)_2..H_2S$$

can be bubbled through this reaction mixture to obtain a greater yield of the $Ca(SH)_2$.

Alternatively the calcium salt of a bridged phenol can be prepared in situ. Thus, calcium base, e.g. calcium hydroxide, a polar solvent having a hydroxy substituent, e.g. methanol and a bridged phenol are slurried together in the desired proportions and $H_2S$ bubbled through the slurry. The bridged phenol can have all its phenolic groups unreacted or some of the phenolic groups can have already been converted to the calcium salt derivatives. The in situ process eliminates intermediate steps and therefore results in process simplification.

Two of the more important characteristics of a detergent-inhibitor used in formulating a railroad diesel lubricant are the absence of silver corrosiveness and good silver lubricity. When the all-calcium salts of bridged phenols prepared as described above are to be used in formulating railroad diesel lubricants they can be treated to improve such characteristics. One such method of treating is the drying treatment described above which comprises blowing with an inert gas. Another is heating at temperatures of from 100° to 300° F. for about 10 to 30 hours in the presence of about 1 to 5 wt. percent water. However, treatment with the inert gas and heating does not always produce satisfactory results unless carried out for a considerable length of time, i.e. at least 10 hours and up to about 30 hours.

Accordingly, it has now been discovered and forms the substance of this invention that treating the all-calcium salt of a bridged phenol with lead oxide results in an additive product having low silver corrosivity and good silver lubricity. Moreover, the lead oxide treatment gives such excellent results very quickly as compared with the other above-described techniques. For example, a two-hour lead oxide treat produces results at least equivalent to and frequently superior to results obtained with either a 30-hour inert gas blowing or 30-hour heating treatment.

In general, the lead oxide treat is carried out as follows. After the calcium salt of the bridged phenol has been formed and substantially all the polar solvent driven off, the reaction mixture is heated to a temperature of about 250 to 500, e.g. 300 to 400° F. and 0.25 to 12.5, e.g. 1.25 to 5.0 wt. percent of PbO is added, the amount of lead oxide being based on the quantity of the calcium salt of the bridged phenol. The lead oxide is thoroughly mixed with the above reaction mixture and stirring continued for 1 to 10, e.g. 2 to 5 hours, at a temperature of from 300 to 500, e.g. 325 to 400° F. Preferably the reaction mixture with the PbO is under a blanket of inert gas, e.g. nitrogen, while the heating and stirring is carried out to reduce the possibility of oxidation. However, the inert gas blanket is not critical. After treatment with PbO the reaction mixture is filtered to recover the treated all-calcium salt of bridged phenol. The filtration can be carried out using conventional techniques such as suction through a Buchner funnel, plate and frame press, cake-cutter suction filter, etc., using a small amount, e.g. 1%, of filter aid as is well known in the art.

In treating the calcium reaction product, certain process steps are important. Thus, desirably the polar solvent having hydroxy constituents is distilled off from the reaction product prior to introduction of the PbO into the reaction mixture. Moreover, the PbO treatment is most effective at temperatures above 300° F., e.g., 325 to 400° F. At temperatures below 325° F. and with quantities of polar solvent in the calcium reaction product less effective results are obtained. That is, the reduction of silver corrosivity is not at a maximum.

The bridged phenols of this invention are aromatic compounds having at least one phenolic group per aromatic group where the aromatic compounds are connected by a bridging group. The substituent atoms of the bridging group are selected from the class of elements comprising hydrogen, carbon, sulfur, oxygen, nitrogen, halogen, silicon and any combination of the foregoing elements. Preferably the substituent atoms of the bridging group are selected from the class of carbon and sulfur. The bridging group will have at least two of its valences satisfied by carbon atoms (i.e. satisfied by a carbon atom from each of two aromatic compounds, e.g. benzene rings, which rings also contain at least one acidic or phenolic hydroxyl radical). Valences in excess of two in the common bridging group may be satisfied by hydrogen, oxygen, nitrogen, silicon or halogen atoms.

The bridged phenols for use in accordance with this invention may be represented by the following formula:

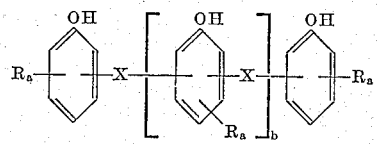

wherein R is a monovalent substituent selected from the group consisting of halogen atoms and hydrocarbon groups having from 1 to 30, preferably 4 to 16 carbon atoms, $a$ is a digit from 0 to 2, $b$ is an integer from 0 to 10 and X is a bridging group having substituent atoms selected from the group consisting of hydrogen, carbon, sulfur, oxygen, halogen, nitrogen and silicon, but preferably sulfur and carbon.

An example wherein X has carbon and hydrogen as substituent atoms is

or methylene. X may be a divalent alkylidene group having from 1 to 16 carbon atoms, for example, methylene, ethylidene, 2,2-propylidene, 1,1-octylidene, etc. R is preferably an alkyl group having from 1 to 30, e.g. 4 to 16, carbon atoms, for example methyl, amyl, iso-octyl, etc., or a halogen, for example chlorine. Specific examples of compounds thus represented by the formula are:

Bis(4-hydroxyphenyl) methane
2,2-bis(4-hydroxyphenyl) propane
Bis(4-hydroxytolyl) butane
Bis(2-hydroxy-5-nonylphenyl) methane
Bis(2-hydroxy-5-octylphenyl) octane
2,2-bis(3-chloro-4-hydroxyphenyl) propane When the bridging group X has sulfur as a substituent atom, the divalent linkage can be, for instance, a sulfide (—S—), a sulfoxide (—SO—), a sulfone (—$SO_2$—) or a disulfide (—S—S—).

Specific examples of phenolic compounds with a bridging sulfur atom include bis(4-hydroxyphenyl) sulfide, bis-(2-hydroxy-5-nonylphenyl) sulfoxide and bis(4-hydroxytolyl) sulfone. In addition to such pure compounds, mixed alkyl phenol sulfides and sulfoxides and sulfones derived from them are included within the scope of this invention. The alkyl phenol sulfides are mixtures thought to contain in addition to simple sulfides, a substantial portion of molecules having more than two phenol groups which are interconnected or bridged by sulfur atoms. They may be produced by treating alkyl phenols with sulfur dichloride according to the teachings of U.S. 2,362,289–93 and by other methods familiar to those skilled in the art. These alkyl phenol sulfides are preferred among the sulfur bridged phenols of this invention. Specific examples of these preferred materials include nonyl phenol sulfide, cresol sulfide, xylenol sulfide, t-amylphenol sulfide and dodecyl phenol sulfide. The metal salts of alkyl phenol sulfides containing between 0.85 and 1.4 moles of sulfur per mole of alkyl phenol are highly soluble in oil and extremely useful in forming the material of this invention when it is to be used in liquid lubricants and greases.

The nonyl phenol sulfide is particularly preferred because of its easy availability and the fact that the length of the alkyl chain seems to be the optimum for detergency and inhibitor effects. The nonyl phenol sulfide may be abbreviated to NPS. Although it is realized that NPS also contains mixtures of related compounds as impurities, the term NPS will be used for purposes of simplicity.

The preferred method of carrying out the reaction of the invention is to ascertain the approximate theoretical amount of calcium needed to completely react with all of the phenolic groups in the bridged phenol to be converted to the metal derivative and to react an excess of the equivalent quantity of calcium needed to combine with every OH group. Thus it is preferred that from 1 to 10 equivalents of calcium be present for every OH group. In some instances it is not desired that every OH group be converted and in such an event from 0.1 to 1 equivalent of calcium can be reacted per OH group. The temperatures of reaction are not critical. In general, the reaction mixture is brought to reflux temperature and held there for 10–200 minutes. Then the polar solvent is distilled off. Utilizing this procedure insures that the reaction is driven to completion and that the polar solvent is removed from the reaction product.

Satisfactory products can be obtained by reacting the bridged phenols directly with $Ca(SH)_2$. The preferred technique, however, is to convert as many phenolic groups to the metal derivative as possible by first reacting the bridged phenol with a calcium base such as CaO Ca(OH)$_2$, and the like. From 0.5 to 10 equivalents of calcium base per phenolic hydroxy group are present in this stage. The unreacted phenolic groups remaining after this reaction are then converted to the metal derivative by reaction with a Ca(SH)$_2$ solution or by adding H$_2$S to the mixture.

The compositions of the invention can be added in amounts of from 0.1 to 20, e.g. 0.5 to 10 wt. percent, to hydrocarbon oils. These hydrocarbon oils can be straight mineral lubricating oils or distillates derived from paraffinic, naphthenic, asphaltic, or mixed base crudes or, if desired, various blended oils may be employed as well as residuals, particularly those from which asphaltic constituents have been carefully removed.

Also, synthetic lubricating oils may be employed in the invention. These include esters of monobasic acids, dibasic acids, glycols, complex esters, esters of phosphoric acid, halocarbon oils, sulfite esters, carbonates, mercaptals, formals, polyglycol type synthetic oils, or mixtures of any of the above in any suitable proportions. Also, mixtures of synthetic and mineral lubricating oils in any suitable proportions may be employed.

Other additives, of course, may be added to the carrier medium composition of the present invention in order to form a finished lubricant. Such additives include oxidation inhibitors such as phenothiazine, phenyl-α-naphthylamine, thiophosphates or P$_2$S$_5$-treated terpenes; pour point depressants such as copolymers of vinyl acetate with fumaric acid esters of coconut oil alcohols; viscosity index improvers such as polymethacrylates; and the like.

The invention will be further understood by the following examples.

In the following examples, the nonyl phenol sulfide oil as produced contained about 70% active ingredient and 30% of white mineral oil of 85–90 SUS viscosity at 100° F. and V.I. of 80–110. This was further diluted with a phenol extracted paraffinic neutral oil of 150 SUS viscosity at 100° F. to a final concentration of 41% active ingredient. All parts are given by weight unless otherwise indicated.

*Example 1*

STEP 1.—PREPARATION OF CALCIUM NONYL PHENOL SULFIDE INTERMEDIATE 169.4 parts of the nonyl phenol sulfide oil blend were heated to about 140° F. At this temperature a blend of 12.78 parts of 99 vol. percent isopropanol and 1 vol. percent water which was blended with 1.83 parts of water to result in a blend of 91 vol. percent isopropanol and 9 vol. percent water was added to the nonyl phenol sulfide oil blend. At the same time 8.20 parts of calcium hydroxide Ca(OH)$_2$ were also added to the nonyl phenol sulfide blend. The resulting mixture was then heated to 248° F. and heat soaked at that temperature for about 10 minutes. The heat soaking removed substantially all the alcohol/water solvent. About 1 wt. percent Speed Plus (a diatomite) was then added to the reaction mixture and stirred. The resulting slurry was then filtered to obtain about 165 parts of a calcium nonyl phenol sulfide intermediate.

STEP 2.—Ca(SH)$_2$ PREPARATION 2.7 parts of calcium hydroxide and 15.0 parts of methanol were blended together. H$_2$S was added to the resulting blend until no more H$_2$S was absorbed. During the H$_2$S treatment, the temperature rose to reflux. The resulting H$_2$S saturated blend was then filtered.

STEP 3.—Ca(SH)$_2$ TREATMENT 160 parts of the calcium nonyl phenol sulfide intermediate of step 1 and 20 parts of the Ca(SH)$_2$ blend of step 2 were mixed together at a temperature of 110° F. The mixture was then heated slowly to about 302° F. while boiling off methanol. The temperature was regulated while heating to 302° F. so that the mixture attained a temperature of about 140° F. in the first hour, about 212° F. in the second hour and finally, 302° F. in the last half-hour.

STEP 4.—LEAD OXIDE TREATMENT (PbO)

When the reaction mixture of step 3 reached 302° F., 1.6 parts of lead oxide, based on the weight of the reaction mixture was then added and the resulting mixture was heated under a nitrogen blanket to about 350° F. at which temperature it was heat soaked for about 2 hours. The mixture was then filtered to yield the desired product.

The above-described process was carried out approximately fifteen times and the ranges and averages of typical inspections on the resulting products are as follows:

TYPICAL INSPECTIONS

Calcium _____ 2.9 to 3.1 wt. percent.
Lead _____ 0.01 to 0.04 wt. percent.
Total base No. as determined
  by ASTM 330–50B _____ 80.
Sulfur _____ 4.23 wt. percent.

*Example 2*

The process of Example 1 was repeated exactly except that step 4 of the lead oxide treatment was omitted. The product was filtered after attaining the temperature of 302° F.

*Example 3*

A Ca(SH)$_2$ solution was prepared by blending 9.9 parts of calcium hydroxide with 52 parts of methanol which was stirred and saturated with H$_2$S and then filtered. 62 parts of the Ca(SH)$_2$ solution was mixed with 150 parts of the nonyl phenol sulfide oil blend at a temperature of 120° F. The resulting mixture was then heated in such a manner that the temperature was about 140° F. after the first hour of heating, about 212° F. after the second hour of heating and about 302° F. in about an additional one-half hour of heating. When the reaction mixture reached 302° F., 1.6 parts of lead oxide was then added and the resulting mixture was then heated under a nitrogen blanket to about 350° F., at which temperature it was held for about 2 hours. The reaction mixture was then filtered to yield a final product.

*Example 4*

To 169.4 parts of the nonyl phenol sulfide oil are added 60.6 parts of methanol with stirring and finally 13.6 parts of calcium hydroxide with stirring. The stirring is continued while hydrogen sulfide is bubbled into the mixture until the mixture is saturated with hydrogen sulfide. The mixture is then heated in such a manner that the temperature rises to about 140° F. in the first hour of heating, 212° F. in the next hour of heating and to 302° F. within the next one-half hour of heating. The mixture is then filtered. If desired, 1.6 parts of lead oxide are added to the mixture which is heated under a nitrogen blanket to about 350° F. and held at that temperature for about two hours. The reaction mixture is then filtered to yield the desired product.

In order to evaluate the significance of the lead oxide treatment with respect to inhibition of silver corrosion the following tests were carried out. 5.7 wt. percent of the product of Example 1 was blended in a phenol-extracted mid-continent oil of about 1,000 SUS at 100° F. Also, 5.7 wt. percent of the product of Example 2 was blended in the same type of mineral oil. The two mineral oil blends were then subjected to the oxidation and silver corrosion test of the Electromotive Division of General Motors, known as EMD. For comparison purposes the two blends of the examples were compared with a commercial lubricant. The commercial lubricant was a mineral oil blend containing 6.0 wt. percent of a commercial detergent and corrosion and oxidation inhibitor additive which consisted of a mixture of calcium-barium phenol sulfide and high alkalinity calcium sulfonate.

This test was carried out as follows. A weighed silver strip and a weighed copper strip were inserted in each of the mineral oil blends. Each mineral oil blend was stirred and air was blown through the blend at a rate of 2 cu. ft./hr. The temperature was kept at a constant 285° F. At the end of 72 hours, the viscosity of the oil blend was evaluated to ascertain the viscosity increase at 100° F., such viscosity being measured in Saybolt Universal seconds (SUS). The silver weight loss in milligrams of the silver strip was also determined. The appearance of both the silver and copper strips was also visually evaluated. The results of these tests are summarized in the following table.

TABLE I

*EMD Oxidation and Silver Corrosion Test Results on Oils Containing the Product of Examples I and II and a Commercial Type Lubricant*

| Additive, weight percent | Percent viscosity increase SUS at 100° F. | Ag weight loss, mgs. | Appearance of silver and copper strips |
|---|---|---|---|
| Example II + oil (untreated), 5.7 | 7.3 | 28.8 | Black deposit on strips. |
| Example I + oil (lead oxide treat), 5.7 | 10.6 | 0.1 | Bright and shiny. |
| Mineral oil blend containing a commercial additive, 6.0 | 12.3 | 0.6 | Do. |

As can be seen from the above table the improvement in silver corrosion and appearance obtained when using the lead oxide treated product is very substantial. In order to further evaluate the effect on silver lubricity obtained by the lead oxide treat, a three-disc silver wear test was carried out. The three-disc silver wear test is designed to measure the silver wear prevention characteristics of lubricants when silver is used as a bearing surface for steel. The test consists of rotating a steel ball on three stationary silver discs under a constantly applied load of 15 kgs. in the presence of the test lubricant at a temperature of 150° C. The speed of rotation is 600 r.p.m. Torque is measured after one and three minutes of operation and every three minutes thereafter up to a total test time of 15 minutes. The apparatus used to carry out this test is a precision Shell 4-ball wear tester with a modified holder for three silver discs. The modified holder replaces that holder which is usually used to hold the three stationary balls. In order to pass this test a lubricant must show a relatively low equilibrium torque value after 15 minutes of testing.

The oil blends which were tested in the above three-disc silver wear test were identically the same as the blends tested in the EMD test described above. After 15 minutes in the three-disc test the oil containing the untreated additive gave a counter reading of about 3800; the oil containing the treated product gave a counter reading of about 1600. In this test the lower the counter reading the lower the friction and the greater the silver lubricity.

In the above specification including the examples all percentages unless otherwise indicated are based on the final composition.

It will be understood that although the above specification defines the invention with particularity, minor modifications can be made therein without departing from the spirit and scope of the invention as hereinafter claimed.

What is claimed is:

1. In the method of preparing calcium metal salts of bridged phenols which comprises reacting each hydroxy substituent of said bridged phenol with from 0.1 to 10 equivalents of a material selected from the group consisting of $Ca(SH)_2$ and a mixture of $H_2S$ plus a calcium base, wherein said bridged phenol has the approximate formula:

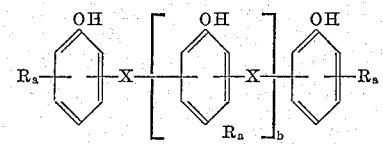

where R is a monovalent substituent selected from the group consisting of halogen atoms and hydrocarbon groups having from 1 to 30 carbon atoms, $a$ is a digit from 0 to 2, $b$ is an integer from 0 to 10, and X is a divalent bridging group having at least one sulfur atom, the improvement which comprises contacting said calcium metal salts of bridged phenols with from 0.25 to 12.5 wt. percent of PbO at a temperature of from 300 to 500° F. for a tome of from 0.1 to 10 hours.

2. A method according to claim 1 wherein about 1.0 wt. percent PbO is used at a temperature of about 350° F. and for a time of about 2 hours.

3. A method according to claim 1 wherein said bridged phenol is nonyl phenol sulfide.

4. A method according to claim 2 wherein said bridged phenol is nonyl phenol sulfide.

5. The method of reducing the corrosivity of a calcium salt of a bridged pmhenol toward metals, including silver and copper, which consists in contacting said calcium salt with from 0.25 to 12.5 weight percent of PbO for from 0.1 to 10 hours at a temperature in the range of 300° to 500° F., said bridged phenol being defined as a compound having the approximate formula:

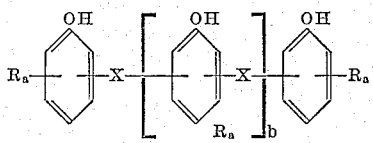

where R is a monovalent substituent selected from the group consisting of halogen atoms and hydrocarbon groups having from 1 to 30 carbon atoms, $a$ is a digit from 0 to 2, $b$ is an integer from 0 to 10, and X is a divalent bridging group having at least one sulfur atom.

6. Method as defined by claim 5 wherein said bridged phenol is nonyl phenol sulfide.

7. The product obtained by the process of claim 5.

References Cited in the file of this patent
UNITED STATES PATENTS
2,766,291    Weissberg    Oct. 9, 1956
FOREIGN PATENTS
1,208,338    France    Feb. 23, 1960